United States Patent
Aue et al.

(10) Patent No.: US 8,769,165 B2
(45) Date of Patent: Jul. 1, 2014

(54) METHOD FOR HIGH SPEED DATA TRANSFER

(75) Inventors: Volker Aue, Dresden (DE); Lars Melzer, Dresden (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 292 days.

(21) Appl. No.: 12/981,680

(22) Filed: Dec. 30, 2010

(65) Prior Publication Data

US 2011/0161536 A1    Jun. 30, 2011

(30) Foreign Application Priority Data

Dec. 30, 2009  (EP) ..................................... 09016149

(51) Int. Cl.
*G06F 13/00*    (2006.01)
(52) U.S. Cl.
USPC ................................. 710/33; 710/34; 710/35
(58) Field of Classification Search
None
See application file for complete search history.

(56) References Cited

U.S. PATENT DOCUMENTS

| | | | | |
|---|---|---|---|---|
| 4,337,463 A * | 6/1982 | Vangen | ........................... | 368/47 |
| 4,373,183 A * | 2/1983 | Means et al. | ................... | 710/124 |
| 4,665,518 A * | 5/1987 | Champlin et al. | ............ | 370/222 |
| 4,933,672 A * | 6/1990 | Blanc et al. | ..................... | 340/6.1 |
| 5,428,753 A * | 6/1995 | Kondo et al. | .................. | 710/107 |
| 5,572,684 A * | 11/1996 | Canik et al. | .................... | 710/106 |
| 6,109,102 A * | 8/2000 | Schneider | ....................... | 73/488 |
| 6,219,735 B1 * | 4/2001 | Kondo et al. | .................. | 710/110 |
| 6,665,807 B1 * | 12/2003 | Kondo et al. | .................. | 713/400 |
| 6,697,295 B2 * | 2/2004 | Farmwald et al. | ........ | 365/189.15 |
| 6,735,247 B2 * | 5/2004 | Lundby | .......................... | 375/227 |
| 6,810,454 B2 * | 10/2004 | Kondo et al. | .................. | 710/110 |
| 6,898,723 B2 * | 5/2005 | Tsai | ............................... | 713/500 |
| 7,260,657 B2 * | 8/2007 | Matsumoto et al. | ............ | 710/52 |
| 7,320,037 B1 * | 1/2008 | Maturi et al. | ................. | 709/236 |
| 7,949,777 B2 * | 5/2011 | Wallace et al. | ............... | 709/232 |

(Continued)

FOREIGN PATENT DOCUMENTS

| | | |
|---|---|---|
| EP | 0306585 A1 | 3/1989 |
| EP | 0465221 A2 | 1/1992 |
| EP | 1434382 A1 | 6/2004 |

OTHER PUBLICATIONS

Prof. Borivoje Nikolic—University of California at Berkeley, Lecture 25: Asynchronous and Self-Timed Logic, Spring 2000, http://bwrc.eecs.berkeley.edu/Classes/icdesign/ee241_s00/LECTURES/lecture25-asynch.pdf.*

*Primary Examiner* — Henry Tsai
*Assistant Examiner* — Jing-Yih Shyu
(74) *Attorney, Agent, or Firm* — SpryIP, LLC

(57) ABSTRACT

A data transfer method is provided which includes: sending a stream of data elements from a source to a sink (controlled by a common clock); simultaneously with the sending of the data element stream, sending a first binary signal to the sink, where the first binary signal is low if a data element is to be ignored by the sink, and is otherwise high; simultaneously with the sending of data element stream, sending a second binary signal from the sink to the source, where the second binary signal is low if the data element is not accepted by the sink, and is otherwise high; and simultaneously with the sending of the data element stream, sending a third binary signal to the sink, where the third binary signal marks a beginning and an end of a logical group of data elements within the data element stream.

10 Claims, 3 Drawing Sheets

(56) References Cited

U.S. PATENT DOCUMENTS

| | | |
|---|---|---|
| 2002/0065967 A1* | 5/2002 | MacWilliams et al. ....... 710/105 |
| 2002/0070796 A1* | 6/2002 | Gay-Bellile et al. .......... 329/304 |
| 2002/0144189 A1* | 10/2002 | Chen .............................. 714/43 |
| 2002/0181571 A1* | 12/2002 | Yamano et al. ............... 375/222 |
| 2003/0081580 A1* | 5/2003 | Vaidyanathan et al. ...... 370/338 |
| 2004/0209575 A1* | 10/2004 | Goodnow et al. ............ 455/90.3 |
| 2005/0091428 A1* | 4/2005 | Matsumoto et al. ............ 710/52 |
| 2005/0169413 A1* | 8/2005 | Van Der Putten et al. .... 375/354 |
| 2006/0271765 A1* | 11/2006 | Tell et al. ......................... 712/35 |
| 2007/0140122 A1* | 6/2007 | Murthy ......................... 370/231 |
| 2007/0263589 A1* | 11/2007 | Francescon et al. .......... 370/350 |
| 2008/0123790 A1* | 5/2008 | Coln et al. .................... 375/355 |
| 2009/0265483 A1* | 10/2009 | Alexandre ...................... 710/22 |
| 2010/0023791 A1* | 1/2010 | Francescon et al. .......... 713/375 |
| 2010/0034321 A1* | 2/2010 | Lee et al. ...................... 375/341 |
| 2011/0158301 A1* | 6/2011 | Aue et al. ..................... 375/222 |
| 2011/0202788 A1* | 8/2011 | Hesse et al. .................. 713/600 |
| 2011/0216861 A1* | 9/2011 | Melzer et al. ................. 375/354 |

* cited by examiner

SSL data transfers

METHOD FOR HIGH SPEED DATA TRANSFER

CROSS REFERENCE TO RELATED APPLICATIONS

This application claims priority of European Patent Application No. 09016149.8 filed on Dec. 30, 2009, the entire disclosure of this application being hereby incorporated herein by reference.

FIELD OF THE INVENTION

The invention relates to a method for transferring data between a data source and a data sink which are controlled by a common clock.

BACKGROUND OF THE INVENTION

Data streaming is known as a method for data transfer.

A simple method to transfer streaming data is by a handshake-type protocol wherein the transmitting entity and the receiving entity synchronize via direct acknowledgment signals. A transmitting party or data source signalizes to be ready for transmission when data are to be sent, and a receiving party or data sink signalizes to be ready for reception when it can or want to process new data. Data transfer does not start unless both the source is ready to transmit and the sink is ready to receive.

The object of the invention is to provide a handshake-based streaming data protocol for intra-circuitry data transfer between and through functional units of a system built in an integrated circuit.

A particular object of the invention is to provide a data streaming method that can be used in a modem of a wireless communication device and that enables to realize a low power, low size communication device.

SUMMARY OF THE INVENTION

According to the invention there is provided a method for transferring data between a data source and a data sink which are controlled by a common clock. The method is particularly useful for streaming data within a system on an integrated circuit. The method comprises sending a stream of data elements from said source to said sink; simultaneously sending a first binary signal from source to sink, said first signal being low if the data element is to be ignored by the sink and otherwise being high; simultaneously sending a second binary signal from sink to source, said second signal being low if the data element is not accepted by the sink and otherwise being high; and simultaneously sending a third binary signal which marks the beginning and the end of a logical group of data elements within the data stream.

BRIEF DESCRIPTION OF THE DRAWINGS

Additional features and advantages of the present invention will be apparent from the following detailed description of specific embodiments which are given by way of example only and in which reference will be made to the accompanying drawings, wherein.

DETAILED DESCRIPTION OF EXEMPLARY EMBODIMENTS

The invention provides a protocol for high speed data streaming in communication devices which will be referred to as Simple Streaming Link (SSL) below.

Figure 1:
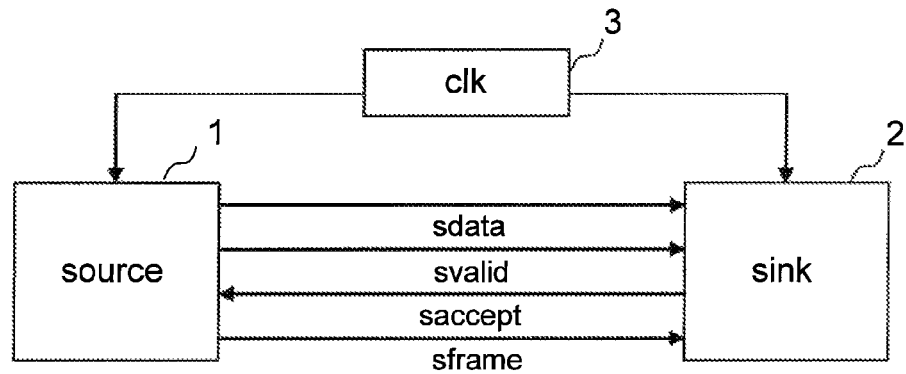
FIG. 1 shows the signal flow between data source and sink according to the data streaming protocol of the invention.

The origin of the data stream is called a 'source' 1, the destination is called a 'sink' 2, as shown in FIG. 1. Data source 1 and a data sink 2 are controlled by a common clock 3.

Figure 2:
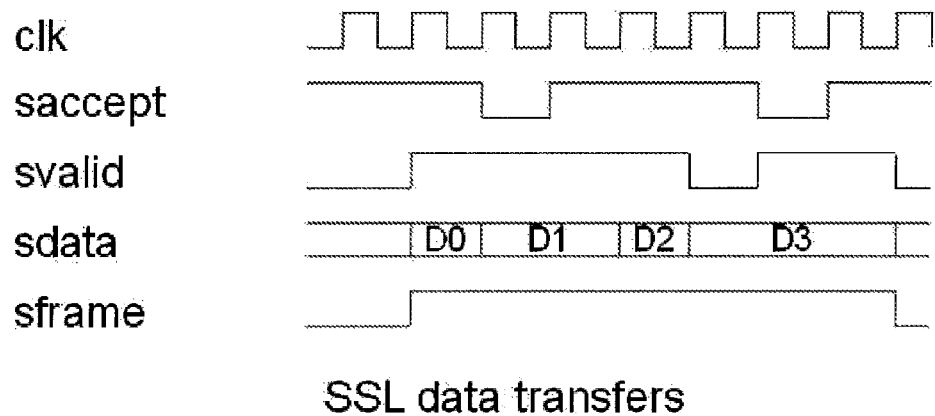
FIG. 2 illustrates one exemplary embodiment of the signal forms of the transfer protocol according to the invention.

SSL comprises four signals: sdata, svalid, saccept, sframe, as illustrated in FIG. 2. 'Clk' is the clock signal from common clock 3.

A stream of data elements that is to be transmitted from source 1 to sink 2 may have a width of multiple bits, e.g. 8, 16, 24, 32 bits.

A first binary signal, svalid, is sent from source to sink. It is low if the data element is to be ignored by the sink, and otherwise it is high.

Simultaneously, a second signal, saccept, is sent from sink to source. This second signal is low if the data element is not accepted by the sink, and is otherwise high.

The svalid and saccept signals thus realize a kind of handshake between source and sink.

According to the invention, the streaming data protocol comprises a third signal, sframe. Source 1 and sink 2 must have the same understanding of what the sframe signal means.

Some of the possible uses of the sframe signal are:

(1) Data transfer only occurs if saccept, svalid and sframe signals are high. The sframe signal marks the beginning and end of a logical group of data elements within the data stream, or a data block transfer. The example of FIG. 2 shows a data block or 'frame' composed of four data elements D0, D1, D2, and D3.

(2) Two streams are multiplexed over one link, and the sframe signal is used to distinguish between the first and the second stream.

(3) The sframe is used to distinguish between data transfer and control transfer.

(4) The sframe signal is not used in which case the sframe signal is always set to high.

The source can set the svalid and sframe signals in advance. The sink can set the saccept signal in advance.

A 'frame' in the sense of the invention is a logical group or sequence of data, such as e.g. an OFDM symbol, a block of control data, a block of information data, etc.

The sframe signal can be used to/for:

Mark the beginning and the end of a logical group/sequence

Synchronization between functional components of a communication device on data level Differentiate between control and data information.

Differentiate between two separate data streams transmitted over the same SSL; for example the third binary signal being high may signify the data belonging to a first logical data stream, and the third binary signal being low may signify the data belonging to a second logical data stream, or vice versa.

Control purposes, e.g. for dynamic clock gating to decrease power consumption.

A particular advantage of the invention is, that the sink does not need to count data to detect the end of a logical group or sequence. Also, the SSL protocol of the invention can be used for activity detection and power control. Another application that is contemplated is reconfiguration control of a switching matrix and the accelerators of functional subsystems in an IC modem architecture as described below in conjunction with FIGS. 3 and 4.

In one application example the SSL protocol of the invention is advantageously used for streaming large amounts of data through subsystems of a communication device, e.g. functional units of an LTE modem.

Figure 3:
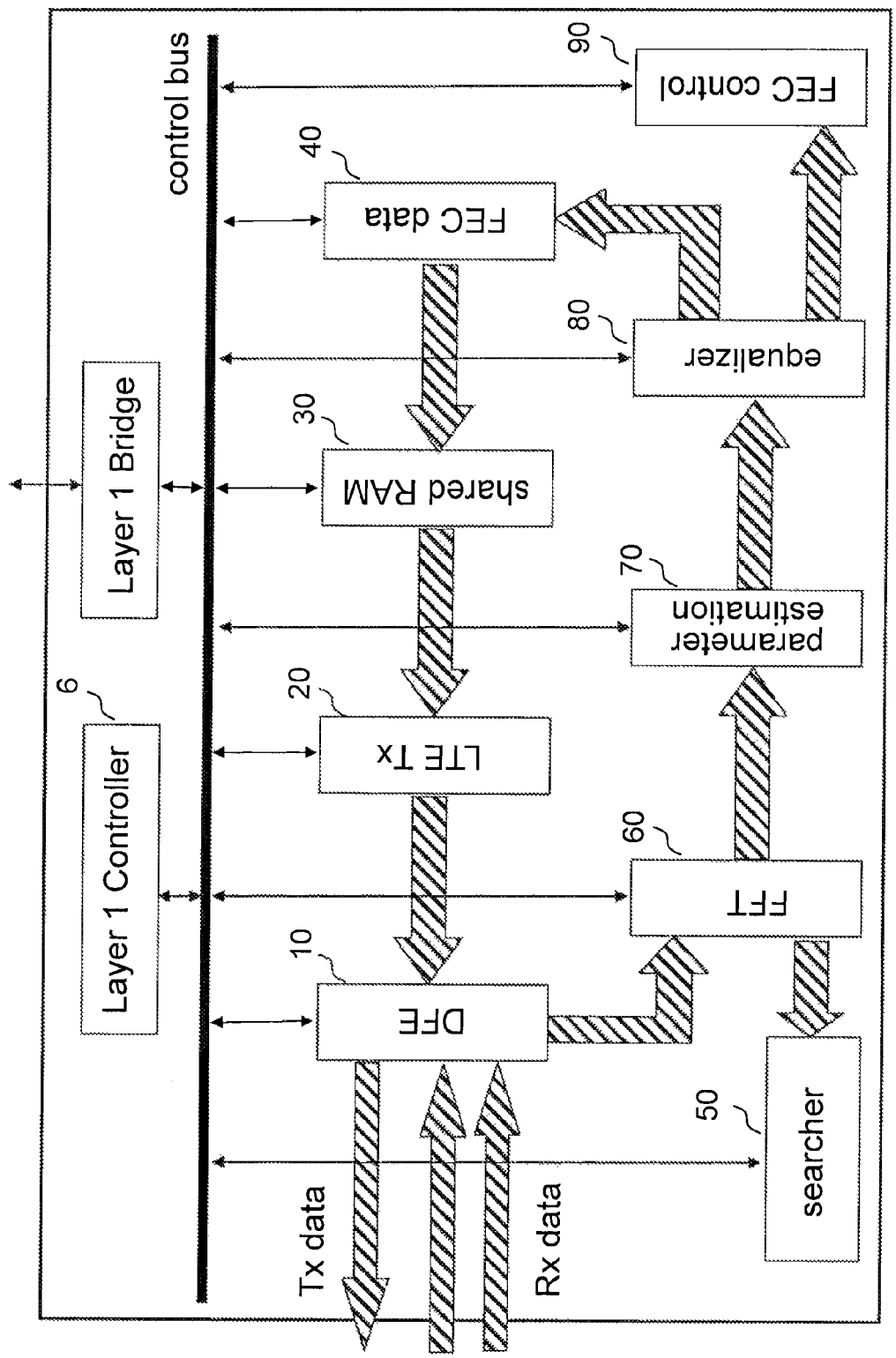
FIG. 3 illustrates an exemplary embodiment of data paths between functional units of a circuit device in which the protocol of the invention can be applied.

For example, FIG. 3 illustrates datapaths of streaming data in an LTE layer 1 subsystem that comprises a plurality of functional units 10-90, in particular digital front end (DFE) unit 10, LTE Tx unit 20, shared RAM unit 30, forward error correction (FEC) data unit 40, fast Fourier transform (FFT) unit 60, parameter estimation unit 70, equalizer unit 80, searcher unit 50, and FEC control unit 90. Here, high rate data streams can be distributed using the Simple Streaming Link (SSL) protocol of the invention without any addressing. SSL data paths are illustrated in large hatched arrows. The low rate and control accesses (illustrated in thin arrows) can be done over a second protocol that comprises addressing, e.g. a AHB based protocol. Any of the functional units 10-90 may be regarded as a data source 1 or data sink 2 in the sense of the invention.

Figure 4:
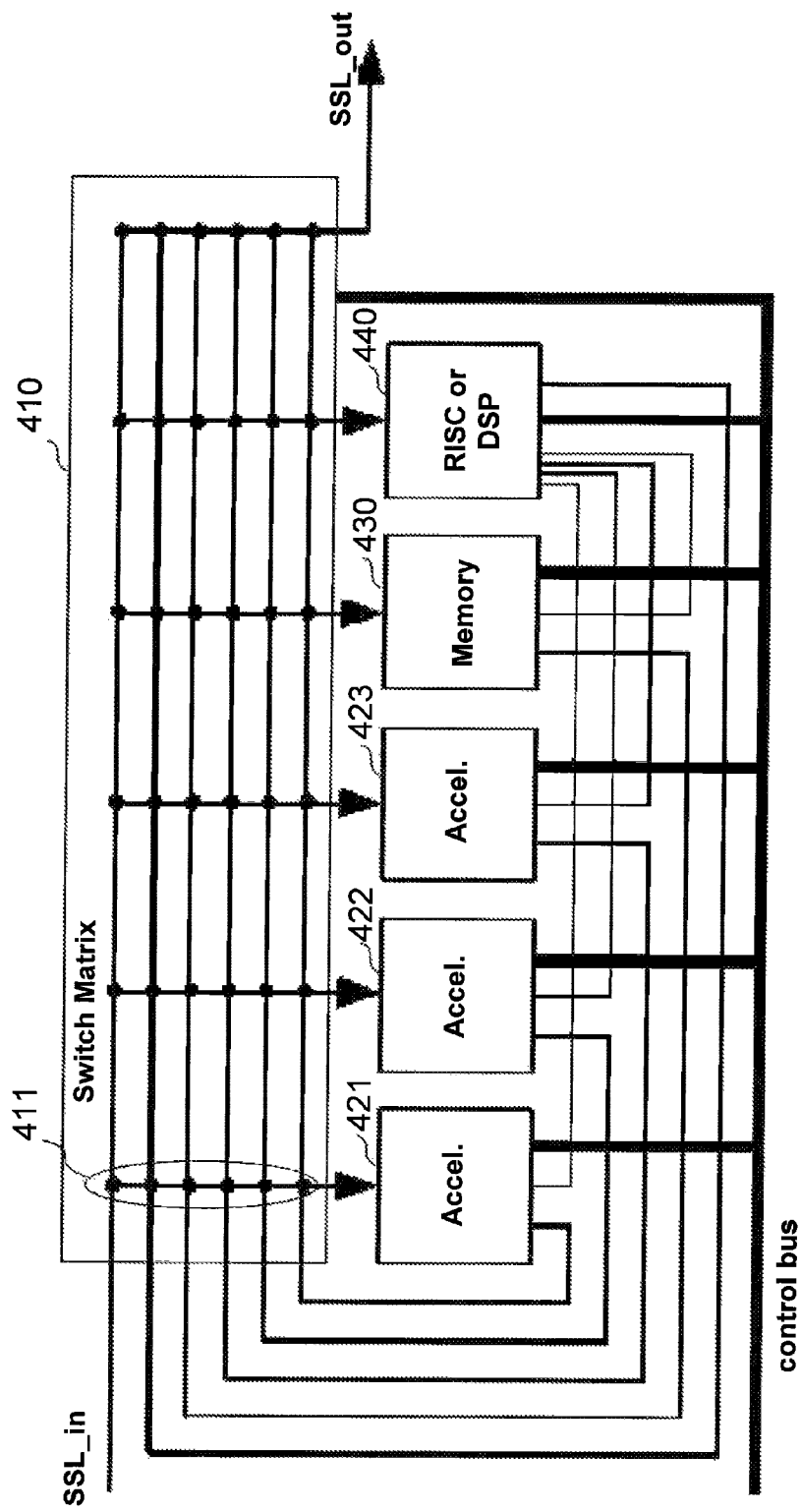
FIG. 4 shows an exemplary component architecture of any of the functional units of FIG. 3.

The SSL protocol of the invention can also be used for streaming data through functional units of a system implemented in an IC. For example, FIG. 4 illustrates an exemplary component architecture for any of the functional units 10-90 shown in FIG. 3.

Each of the functional units 10-90 may comprises a plurality of sub-components including a local RISC or digital signal processor 440, a plurality of hardware accelerators 421-423, and, optionally, at least one memory module 430. Also, each of the functional units may comprise a switching matrix 410 connected between a streaming data input of the respective functional unit and each of said sub-components. The switching matrix can be configured at run time.

Local processor 440, in this application example, is adapted to receive task instructions from a controller 6 of the modem device (shown in FIG. 3) over a first bus system using a first protocol. The first protocol includes addressing and may be an AHB based protocol. The local processor, in response to the task instructions from the controller, configures the sub-components 421-423, 430 and switches switching matrix 410 to selectively produce connections 411 between the data streaming input and said sub-components in a manner to perform the dedicated task.

Details on the SSL Signals are summarized in the following table:

| Signal | Source | Sink | Description |
| --- | --- | --- | --- |
| sdata | output 1 . . . n bits | input 1 . . . n bits | Streaming data element. Standard width is 32 bits. The data width is the minimum granularity the SSL supports. |
| svalid | output 1 bit | input 1 bit | The valid/accept handshake is used to drive and stall the communication from source to sink. |
| saccept | input 1 bit | output 1 bit | Source and sink can set or reset these signals at any time. Data is taken over if both are 'high' on the rising edge of the clock. |
| sframe | output 1 bit | input 1 bit | Set to 'high' during one block transfer, e.g. 2048 words of data. The sink can determine the start of the transfer by looking for a rising edge and the end by looking for a falling edge. The svalid signal might not be active in the first cycle. sframe is 'low' after a block transfer. |

In case the sframe signal is not used by a source, it can clamp the output to "high". In case a sink does not know how to interpret an incoming sframe signal, it can be ignored.

The invention claimed is:

1. A method for transferring data between a source and a sink which are controlled by a common clock, comprising:
    sending a stream of data elements from the source to the sink;
    simultaneously with the sending of the stream of data elements, sending a first binary signal from the source to the sink, the first binary signal being low if a data element of the stream of data elements is to be ignored by the sink and otherwise being high;
    simultaneously with the sending of the stream of data elements, sending a second binary signal from the sink to the source, the second binary signal being low if the data element of the stream of data elements is not accepted by the sink and otherwise being high; and
    simultaneously with the sending of the stream of data elements, sending a third binary signal from the source to the sink, wherein the third binary signal marks a beginning and an end of a logical group of data elements within the stream of data elements.

2. The method of claim 1, wherein a data element of the stream of data elements is accepted by the sink if the first binary signal, the second binary signal and the third binary signal are high.

3. The method of claim 1, wherein the third binary signal being high signifies data in the stream of data elements belonging to a first logical group of data elements, and the third binary signal being low signifies data in the stream of data elements belonging to a second logical group of data elements.

4. The method of claim 1, wherein the third binary signal is ignored by the sink when the sink is unable to interpret the third binary signal.

5. The method of claim 1, wherein when merely one logical group of data elements is present within the stream of data elements, the third binary signal is set to high by the source.

6. The method of claim 1, wherein the sink determines the beginning of the logical group of data elements by detecting a rising edge and the end by detecting a falling edge of the third signal.

7. The method according to claim 1, wherein the source is a functional unit of a wireless communication device.

8. The method of claim 1, wherein the sink is a functional unit of a wireless communication device.

9. The method of claim 7, wherein the functional unit is one of a group consisting of digital front end (DFE) unit, LTE Tx unit, shared RAM unit, forward error correction (FEC) data unit, fast Fourier transform (FFT) unit, parameter estimation unit, equalizer unit, searcher unit, FEC control unit of an LTE modem device, accelerator component, memory module component, RISC processor component, and DSP processor component.

10. The method of claim 8, wherein the functional unit is one of a group consisting of digital front end (DFE) unit, LTE Tx unit, shared RAM unit, forward error correction (FEC) data unit, fast Fourier transform (FFT) unit, parameter estimation unit, equalizer unit, searcher unit, FEC control unit of an LTE modem device, accelerator component, memory module component, RISC processor component, and DSP processor component.

* * * * *